United States Patent [19]

Treat

[11] Patent Number: 4,726,865

[45] Date of Patent: Feb. 23, 1988

[54] LIMP LABEL APPLICATION PROCESS

[75] Inventor: Douglas H. Treat, Manchester, N.H.

[73] Assignee: Yankee Concepts, Inc., Center Ossipee, N.H.

[21] Appl. No.: 37,868

[22] Filed: Apr. 13, 1987

Related U.S. Application Data

[63] Continuation of Ser. No. 801,408, Nov. 2, 1985, abandoned, which is a continuation of Ser. No. 589,900, Mar. 15, 1984, abandoned.

[51] Int. Cl.[4] .......................... B32B 31/00; B44C 1/00

[52] U.S. Cl. ..................................... 156/249; 156/285; 156/361; 156/542; 156/DIG. 31

[58] Field of Search ............... 156/230, 235, 238, 249, 156/267, 285, 361, 497, 541, 542, DIG. 33, DIG. 31, DIG. 37, 267, 354

[56] References Cited

U.S. PATENT DOCUMENTS

| | | | |
|---|---|---|---|
| Re. 30,419 | 10/1980 | Crankshaw et al. | 156/249 |
| 3,436,293 | 4/1969 | Newman | 156/240 |
| 3,565,724 | 2/1971 | Yamaguchi | 156/354 |
| 3,912,570 | 10/1975 | Schweisfurth | 156/DIG. 37 |
| 3,944,455 | 3/1976 | French | 156/DIG. 33 |
| 4,021,293 | 5/1977 | Tofal | 156/DIG. 31 |
| 4,029,537 | 6/1977 | Kish | 156/DIG. 33 |
| 4,132,583 | 1/1979 | Hodgson | 156/DIG. 33 |
| 4,181,555 | 1/1980 | Hoffman | 156/267 |
| 4,321,103 | 3/1982 | Lindstrom et al. | 156/DIG. 33 |
| 4,332,635 | 6/1982 | Holbrook et al. | 156/267 |
| 4,333,781 | 6/1982 | Meulenberg | 156/361 |
| 4,336,095 | 6/1982 | Hoffmann | 156/DIG. 31 |
| 4,367,118 | 1/1983 | Karp | 156/DIG. 33 |
| 4,390,386 | 6/1983 | Bartl | 156/249 |
| 4,475,969 | 10/1984 | Reed | 156/267 |
| 4,488,922 | 12/1984 | Instance | 156/249 |

*Primary Examiner*—Donald E. Czaja
*Assistant Examiner*—Louis Falasco
*Attorney, Agent, or Firm*—Lee A. Strimbeck

[57] ABSTRACT

An applicator for applying pressure sensitive adhesive labels that have no memory or are "limp" is characterized by the use of a transfer wheel having a resilient perforate surface through which a vacuum is applied to pick a label off of its supporting web. This can be done without the need to waste the label. The label so picked up0 by the transfer wheel is then applied to a product with the resilient surface effecting a pressured squeegeeing action to firmly adfix the label.

7 Claims, 4 Drawing Figures

LIMP LABEL APPLICATION PROCESS

This is a continuation of application Ser. No. 801,408, filed 11-2-85, which in turn was a continuation of Ser. No. 589,900, filed 3-15-84, both abandoned.

This invention is a label applicator for applying pressure sensitive or self-adhesive labels. More particularly, this invention is directed to a method and apparatus for applying a series of pressure sensitive adhesive bar code labels that are limp, i.e. have no "memory", especially to small curvilinear or irregular-shaped objects such as circuit board components. The message of the label may be fixed and/or variable item to item.

PRIOR ART

A pre-examination search reported the following references:

| | |
|---|---|
| 3,912,570 Schweisfurth | *4,132,583 Hodgson |
| *3,944,455 French | 4,321,103 Lindstrom et al |
| *4,021,293 Total | 4,336,095 Hoffman |
| *4,029,537 Kish | *4,367,118 Karp |

The astericked references appear to be slightly more pertinent. While these references deal with the removal of pressure sensitive adhesive labels from a carrier web and applying them to a series of product, none seem to appreciate the concept of the present invention, viz: very limp, pressure sensitive adhesive labels can be removed from a carrier web quite facilely by being "picked" from the web by means of a vacuum rather than having to rely on the memory of the label to effect at least the initial separation of the label from the carrier web. Compare U.S. Pat. No. 4,367,118. This reference while using a vacuum to help effect the transfer of the label from the carrier web to the product did not take that last final step, essential to the present invention, of having the vacuum break or pick off the label from the web—it relied on the conventional technology of using a label with memory and stripper bar 20 to accomplish the separation of the label from the web.

INTRODUCTION

Until now label applicators for applying a series of pressure sensitive adhesive labels, especially of the bar code type, used a label of sufficient stiffness or memory such that when the web was passed over a breaker edge or stripper bar with a sharp change in direction, the memory and perhaps the momentum of the label would effect separation of at least the leading edge of the label from the transporting web with the label then being applied to the product either directly or via some intermediate transfer mean. Labels that have sufficient memory to be separated in this manner are too stiff or rigid to conform and adhere well to small curvilinear or irregular-shaped objects such as circuit board components—capacitors, connectors, resistors. A pressure sensitive adhesive label on a very thin stock, e.g. an organic film of about paint film thickness that has no memory or is "limp" will conform readily to such small irregular-shaped objects without additional processing steps but until now there has been no satisfactory way of rapidly and automatically removing such labels from a web and applying them to a product.

The accuracy of placement or registration of previous self-stick label applicators has also been a problem. The very act of causing a stiff label to be thrown from a carrier web leads to inaccuracies in registration. Further, earlier label applicators often required sensitive and difficult mechanical adjustments by hand tools for each different label and product application. There has been a desideratum for a label applicator that can be readily adjusted by means of a control panel to accommodate different sizes of labels and products and speeds of operation without the use of hand tools and mechanical timing adjustments.

THIS INVENTION

In brief compass this invention is a method and apparatus for applying a series of limp, pressure sensitive adhesive or self-adhering labels with no memory, especially bar code labels, supplied by a carrier web to a series of products rapidly and accurately. The essence of this invention is that a vacuum transfer surface is used to "pick" a limp label from a carrier web as opposed to using a label with sufficient memory that it will itself separate from the web with an abrupt change in direction of the web. An important benefit accruing to the present invention is that a series of pressure sensitive adhesive labels on a web do not have to be "wasted", i.e. have the background areas removed, prior to the label being picked from the web and further the labels may abut one another without waste therebetween. Prior art label applicators required that such labels be wasted and not abutting prior to being removed from the web.

The label application process of this invention comprises the following essential steps, in combination. A carrier web having a series of pressure sensitive adhesive labels is provided with the adhesive side of the labels facing the web. This carrier web is advanced past a transfer station that picks a label from the web onto a resilient transfer surface by vacuum applied through the transfer surface in the area of the label but not in the waste area. The transfer surface is normally carried on a transfer roll and is perforate to permit the application of the vacuum. Having received the label the transfer surface is rotated to initiate contact with the product unit to be labelled, the product unit usually being carried on a conveyor. After contact has occurred, the vacuum through the transfer surface is released and the motion of the transfer roll and product is continued such that the label is pressed on to the surface of the product. The transfer surface is then returned to the start position to receive the next label and to repeat the process.

The transfer roll used is preferably a resilient surface such as one made of a RTV silicone that is perforate in the area of the label to be transferred. Normally a transfer surface is individualized to a particular type of label to be transferred. With each change of label to be transferred, the transfer surface of the apparatus is changed so that vacuum is appropriately applied to the surface of the label but not to the background or waste area of the label stock.

The label stock used preferably is a sheet so thin and limp that it will drape at room temperature over a sharp edge such as a knife blade and adhere to the surface on either side, i.e. it has no memory whatsoever. The films used will normally be less than 1 mil thick (0.0001 inch) although thicker films can be used especially if some heating of the label is done prior to application. With such limp stock, when the label is pressed against a curvilinear or irregular-shaped object by the resilient transfer surface, it flows and conforms to the irregular shape of the object quite readily. This placement is aided by the resilient surface which helps squeeze out any air and press the labels onto the curves and congruities of the product.

The label applicator of this invention comprises a transport means moving a web carrying a series of the pressure sensitive self-adhesive labels through a transfer station. The transport means usually consists of a set of pinch rolls on either side of the transfer station, the ones on the downstream side being driven to pull the web through the transfer station. Preferably these pinch rolls are adapted to move the web up away from and down into the contact with the transfer surface as each label is passed through.

The transfer station includes the resilient transfer surface normally carried on a transfer wheel through which a vacuum can be ap plied and drive means for rotating the transfer surface. There is a product conveyor conveying a series of products through the transfer station to receive the labels. There is a means for applying a vacuum through the transfer surface in the area of its perforation at the time of label pickup and for releasing the vacuum at the time of label transfer to the product.

Integral with the apparatus are sensing means for determining the position of the label on the web and of the product to be labelled relative to the position of the transfer wheel as both advance to the transfer station. A microcomputer processor receives the determinations of the sensing means and is operatively connected to the web transport, the transfer wheel drive, and the product conveyor and controls the relative position of the web, the transfer surface and the product to effect placement of a label onto a product in registration with a predetermined point of placement. This can be done with an accuracy of 0.01 inch or better without difficulty as the microprocessor permits exquisitely fine adjustment of the label placement by control of servo motors operating the web transport, transfer surface drive and product conveyor.

In addition to the above elements, the label applicator may have means to sense a property of the product to be labelled such as weight prior to the transfer station, and a printer for imprinting a label destined for that product with variable information such as price in response to the determination as the label is advanced on the web to the transfer station. Further, this printing of variable information, e.g. in bar code form, may be done prior to the die cutting of the label on the web and can be followed by die cutting of the label without removal of waste just prior to the vacuum pickup on the transfer surface. This permits the bar code label to be overprinted or extend beyond the boundaries of the label such that after cutting there is no discontinuity of the width of the bar code at the edges of the label which discontinuities would tend to cause erroneous readings.

THE DRAWINGS

DESCRIPTION

Figures 1, 2, 3, 4:
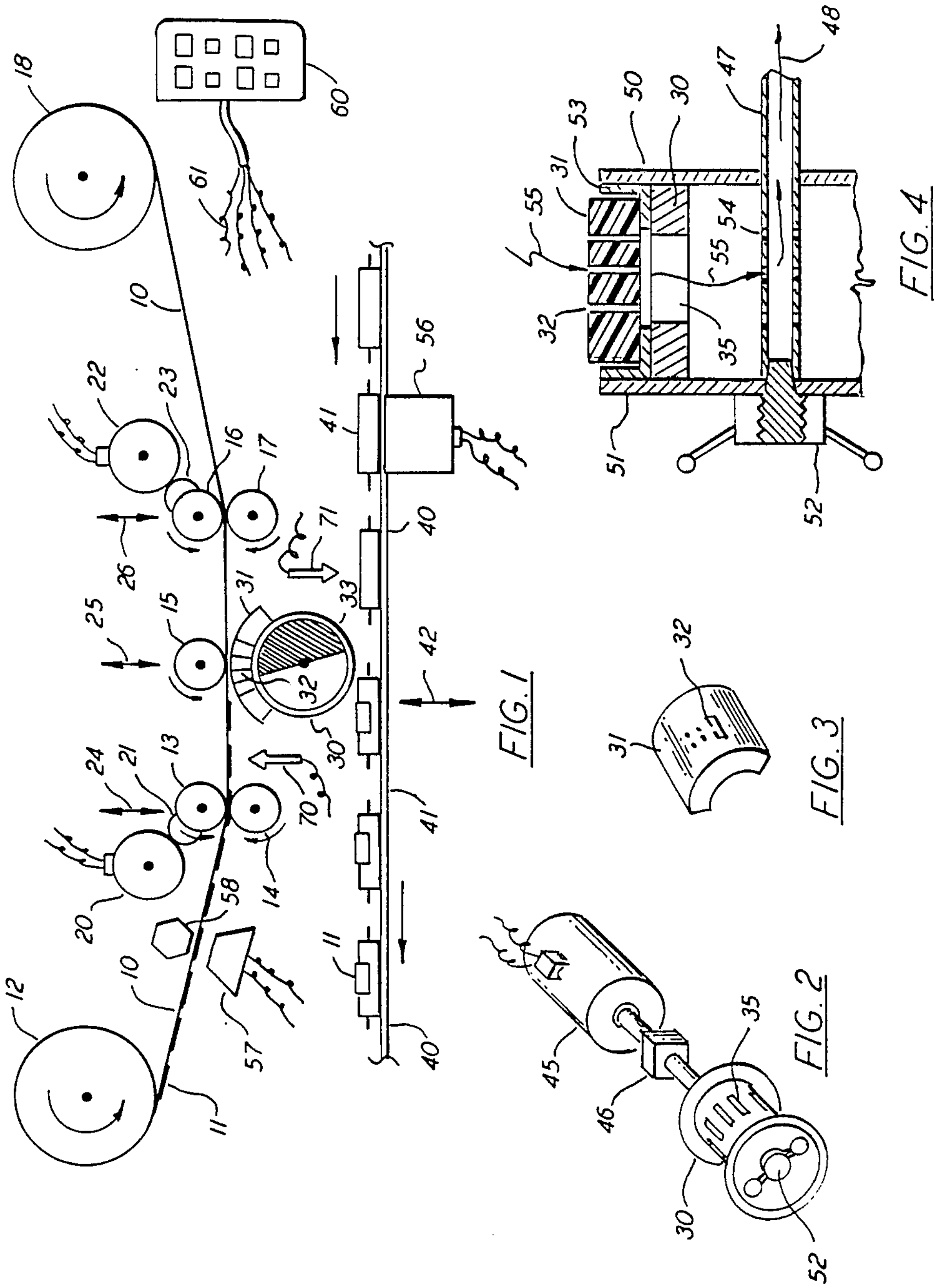
FIG. 1 is a schematic illustration of the process and apparatus of this invention.
FIG. 2 is a schematic perspective of the transfer wheel and its drive.
FIG. 3 is a view of the resilient perforate transfer surface.
FIG. 4 is a schematic enlarged cross-sectional view of the transfer wheel with the perforate transfer surface clamped in place.

With reference to the drawing, a web 10 carrying a series of self-stick or pressure sensitive adhesive labels 11 is supplied from a roll 12. The web and labels are prepared in a known manner with the adhesive side of the labels facing the web. The web passes through a first set of pinch rolls 13 and under a backup roll 15 and through a second set of pinch rolls 16 and 17 and thence to a takeup roll 18. Pinch rolls 13 and 14 are driven by a servo motor 20 operating through a gear 21. Pinch rolls 16 and 17 are driven by a servo motor 22 operating through a reduction gear 23. Rolls 13, 14, 15, 16 and 17 are made to move up and down by conventional means not shown as indicated by directional arrows 24, 25 and 26 respectively.

While labels 11 are shown for purposes of clarity as being separate from one another, this need not be so as they can be supplied abutting and without being wasted, that is without having their background removed. They can be blank or preprinted and supplied from roll 12 or can be printed on the fly, especially with variable information after web 10 leaves roll 12 as explained infra.

A transfer roll 30 is placed below the web and carries on its periphery a transfer surface 31 made of a resilient material of substantial thickness; for example a rubber or a urethane foam. The transfer surface 31 is perforate at 32 to allow the vacuum to be applied to the outermost surface. As a label is advanced to the transfer surface and its leading edge comes in register with the leading edge of the transfer surface's area of perforations, a vacuum is applied to pick the label from the web. The adhesive side of the label is on the other side from the transfer surface and the transfer suface does not come into contact with the adhesive. As the transfer surface is resilient and conforming, little air passes through the perforations 32 and the label is picked up smoothly.

After receiving the label, the transfer wheel 30 rotates to a position where the transfer surface initiates contact with the product and is held there until product contact is made. The shaded area 33 within the transfer roll is indicative of the duration of the application of vacuum and the unshaded area indicates when vacuum is released.

A conveyor 40 which can be for example a trough transport brings a series of products 41 into the transfer station to receive the labels. Conveyor 40 can be moved up and down as indicated by arrow 42 to adjust the spacing between the product and the transfer wheel. For any one series of products this spacing once adjusted can remain fixed. Preferably transfer wheel 30 is caused to move down to effect contact of the label with the product and to move up out of contact until the next product of the series is in position. Product 41 as illustrated could be a series of small PROMs or integrated circuits. If one were to attempt to put a conventional label with a memory on this component, the label would not conform and would stick out at the sides. Additional processing would be required to secure adhesion. In the present invention the limp label once laid down on a product from transfer surface 31 immediately drapes over it and conforms thereto.

Referring to FIG. 2, preferably the transfer wheel 30 is driven by a servo motor 45 operating through a clutch 46. In a preferred embodiment servo motor 45 intermittently drives wheel 30 during such time as the transfer surface 31 is not being driven by web 10 or the product 41 on conveyor 40 by contact therewith. Normally, the transfer roll 30 will rotate through 360° with each cycle but in some situations it may be desirable to have the transfer roll reciprocate back to the start position rather than make a complete revolution; i.e. it may rotate say only 220° or less and then be returned by backward rotation as by spring drive to its start position.

FIG. 3 shows the transfer surface 31 which is of a fairly resilient rubber or foamed elastomer, for example, one having a Durometer in the range of 60 to 90 Shore A. The transfer surface 31 is preferably cast in the form of a cylindrical surface in the range of ½ inch to 2 inches thick or more, e.g. 1 inch. It is perforate at 32 in any desired pattern that most effectively picks up the limp label. This pattern will vary with the label size shape and material. Normally the leading edge of the vacuum area will have more open area and the rearward edge will have less or none.

As an alternative to the use of a non-porous elastomer which is perforated in the area of the label, one may use for transfer surface 31 a porous material such as an open cell urethane foam and use a mask thereover to define the waste area and prevent air from passing through the transfer surface in these areas.

The transfer surface may have any necessary diameter, a diameter in the range of 2 to 8 inches usually being most convenient. It will normally cover ⅓ or less of the periphery of roll 30.

Transfer surface 31 preferably is quite smooth and can be made to close tolerances by machining and perforating the rubber while frozen.

Referring to FIG. 4, shown is the transfer wheel 30 with the transfer surface 31 in place in somewhat enlarged cross-section. A hollow drive shaft 47 to clutch 46 (FIG. 2) is supported in a suitable frame and carries transfer wheel 30. Vacuum is applied to the hollow drive shaft as indicated by arrow 48 by known means not shown. Wheel 30 has a fixed inner end plate 50 and a removable outer end plate 51. The outer end plate is clamped to wheel 30 by means of a finger operated quick acting locking nut 52. Locking nut 52 threads on to the end of shaft 47. Transfer surface 31 is clamped between end plates 50 and 51 under the action of locking nut 52. Preferably a soft rubber spacer 53 is interposed between the transfer wheel 30 surface, which is usually of a metal or rigid plastic, to effect an airtight seal between the transfer roll and the transfer surface. Transfer surface 31 is perforate at 32. The transfer wheel has transverse slots 35 (FIG. 2) and there are mating slots in gasket 53 to permit perforations 32 to communicate with the interior of transfer wheel 30. Shaft 47 is similarly perforate at 54 such that air may flow as indicated by arrows 55 through perforations 32, slot 35, perforations 54 and out through shaft 47.

As previously indicated, transfer surface 31 is usually individualized for each type of label so that there is good vacuum pickoff of the label from the web. The clamping mechanism shown in FIG. 4 permits rapid changing of the transfer surface 31.

A microprocessing unit 60 (FIG. 1) effects all the adjustments of the apparatus necessary without the use of hand tools. It is necessary of course to adjust the machine for different sizes of labels and spacing of labels, for different spacings of product and sizes of products and for different speeds of operation. Each of the servo motors affecting the physical movement of different parts of the machines are operatively interconnected with the processing unit 60 as indicated by electrical connection line 61. Besides motors 20, 22 and 45, there are servo motors operating the up and down positions of web 10 and the up and down positions of the transfer wheel 30 as well as the drives for the conveyor and the take up and supply rolls 12 and 18. When a new product and label are to be handled, a transfer surface 31 of appropriate perforate configuration 32 is placed on transfer roll 30 and registration of the label to a predetermined location on the product is set by adjusting the relative speeds, timing and placement of the various elements via processing unit 60. This is accomplished in part by having sensing unit 70 and 71 shown in FIG. 1 interconnected with the processing unit 60. For example, sensing unit 71 can be a photoelectric cell set to determine the leading edge of a bar code and sensing unit 71 can similarly sense the leading edge of the product 41. The microprocessor can then readily time the movements of the web 10, transfer wheel 30, and the movement of product 41 on conveyor 40 to obtain the registration desired which can be with an accuracy greater than plus or minus 0.005 inches. This is so even though product 41 may be randomly spaced on a conveyor 40.

Preferably wheel 30 is operated intermittently as opposed to being operated at a constant speed of revolution. In this embodiment when transfer surface 31 is in contact with web 10, web 10 drives or rotates surface 31 overriding servo motor 45 through clutch 46. When the transfer of the label 11 is complete, web 10 is lifted up, the microprocessing unit 60 causes servo motor 45 to operate snapping wheel 30 around to a position where transfer surface 31 is ready to contact product 41 in advance of the product having reached the transfer station. As product 41 is advanced by conveyor 40 it engages the resilient transfer surface 31 causing it to rotate and overriding servo motor 45 through clutch 46. The vacuum is released and the limp label is transferred to product 41. Product 41 then clears transfer surface 31 as it proceeds along conveyor 40. At this point the microprocessing unit commands the servo motor 45 to return wheel 30 and transfer surface 31 to the start position to receive the next label in the series.

In addition to the basic components above described, the label applicator of this invention can also include means 56 connected to processor 60 for sensing or determining a property of product 41 such as weight. A printer 57 with impact bar 58 also connected to processor 60 can then be commanded to imprint the label destined for that particular product with variable information such as price responsive to that sensing or determination.

In summary, the method and apparatus of the present invention is unique in several aspects. First, a vacuum transfer surface is used to pick a pressure sensitive label from a carrier web in contrast to having the label separate itself from the web by reason of its memory or inertia. The transfer surface here used is resilient besides being perforate to permit the application of a vacuum at its surface. This resilient transfer surface permits an intimate or kissing contact with the label during pickup with little air seepage and further permits firm application of the label to the product with a squeegeeing action to remove air. Prior art devices did not use a resilient surface in this manner.

The fact that the labels do not have to be wasted prior to transfer is of considerable importance because:

(1) very small and/or irregular die cut labels can be handled;

(2) butt cut labels can be dispensed;

(3) very fragile pressure sensitive adhesive labels can be handled.

With the prior art label applicators if the labels abutted one another without being wasted in between, then the pressure sensitive adhesive would flow back into the butt cut and join one label to the next one and prevent it from coming loose as it was passed over a breaker edge. Therefore, it was necessary with the prior art labelling devices to allow some spacing between labels and to waste them prior to being transferred from the carrier web to permit the leading edge of the label to lift free from the web as the web abruptly changed direction.

The label apparatus of this invention can be used in tandem as will be appreciated by the skill in the art. The present label transfer system can be used as well to transfer labels with memory as well as limp labels. A first transfer station can lay down a label on a product and a second transfer station in tandem can then overlay that label with another label and/or protective covering such as of a clear plastic. Two or three layers can be built up in this manner and since the permitted registration is so highly accurate unusual color effects and printing depths can be obtained for example in the manner rotogravure printing of a color on each of several layers of a clear plastic.

I claim:

1. A label application process comprising the steps, in combination, of:

a. providing a carrier web having a series of die cut pressure sensitive adhesive labels thereon that have not had the background areas removed, the adhesive side of said labels facing said web;

b. conveying a series of product units to be labelled through a transfer station, each of said product units having a surface receptive to one of said labels;

c. advancing said carrier web past said transfer station and picking a first label therefrom onto a transfer surface by vacuum applied through said transfer surface while sensing the leading edge of said first label and controlling in response to said sensing the position of the leading edge of said transfer surface to be in register with the leading edge of said first label, the area of said transfer surface being coextensive with the area of said first label, said carrier web with said first label thereon not being subjected to a sharp change in direction or abrupt turn prior to or in conjunction with said picking for the purpose of aiding the separation of said first label from said carrier web, and said transfer surface and vacuum making contact with said first label prior to the time of initiation of separation of said first label from said carrier web such that said vacuum is responsible for initiating said separation;

d. rotating said transfer surface to a position to initiate contact with the surface of a first product unit of a said series of product units;

e. initiating contact between said transfer surface and first lael and said first product unit and passing said first product unit through said transfer station while releasing said vacuum and transferring said first label to the surface thereof;

f. returning said transfer surface to the start position to receive the next label in said series;

and repeating the process.

2. The process of claim 1 wherein the labels of said series each have an image thereon and are made from a continuous sheet and wherein said image of each label is overprinted with the labels then being die cut through said image to said web without removal of waste.

3. A label application process comprising the steps, in combination, of:

a. providing a carrier web having a series of die cut pressure sensitive adhesive labels thereon that have not had the background areas removed, the adhesive side of said labels facing said web, said labels being limp and having substantially no memory;

b. conveying a series of product units to be labelled through a transfer station, each of said product units having a surface receptive to one of said pressure sensitive adhesive labels;

c. advancing said carrier web past said transfer station and picking a first label therefrom onto a transfer surface by vacuum applied through said transfer surface while sensing the leading edge of said first label and controlling in response to said sensing the position of the leading edge of said transfer surface to be in register with the leading edge of said first label, the area of said transfer surface being coextensive with the area of said first label, said carrier web with said first label thereon not being subjected to a sharp change in direction or abrupt turn prior or in conjunction with said picking for the purpose of aiding the separation of said first label from said carrier web, and said transfer surface and vacuum making contact with said first label prior to the time of initiation of separation of said first label from said carrier web such that said vacuum is responsible for initiating and separation;

d. rotating said transfer surface to a position to initiate contact with the surface of a first product unit of said series of product units;

e. initiating contact between said transfer surface and first label and said first product unit and passing said first product unit through said transfer station while releasing said vacuum and transferring said first label to the surface thereof;

f. returning said transfer surface to the start position to receive the next label in said series;

and repeating the process.

4. The process of claim 3 wherein said labels are bar code labels and are of an organic film less than 0.001 inches thick.

5. The process of claim 3 wherein said series of labels are applied to a series of said products with a registration within the range of plus or minus 0.005 inches.

6. The process of claim 3 including the steps of determining a property of said product unit prior to said product unit reaching said transfer station and imprinting said first label with variable information in response to said determination prior to said first label being advanced to said transfer station.

7. A label application process comprising the steps, in combination, of:

a. providing a carrier web having a series of die cut pressure sensitive adhesive labels thereon that have not had the background areas removed, the adhesive side of said labels facing said web;

b. conveying a series of product units to be labelled through a transfer station, each of said product units having a surface receptive to one of said pressure sensitive adhesive labels;

c. advancing said carrier web past said transfer station and picking a first label therefrom onto a transfer surface by vacuum applied through said transfer surface, while sensing the leading edge of said first label and controlling in response to said sensing the position of the leading edge of said transfer surface to be in register with the leading edge of said first label, said transfer surface being a perforate resilient surface carried on a transfer wheel and the area of said transfer surface being co-extensive with the area of said first label, said transfer surface and vacuum making contact with said first label prior to the time of initiation of separation of said first label from said carrier web such that said vacuum is responsible for initiating said separation;

d. rotating said transfer surface to a position to initiate contact with the surface of a first product unit of a said series of product units;

e. initiating contact between said transfer surface and first label and said first product unit and passing said first product unit through said transfer station while releasing said vacuum and transferring said first label to the surface thereof;

f. returning said transfer surface to the start position to receive the next label in said series;

and repeating the process, wherein said transfer wheel is driven by a servo motor operating through a clutch, wherein said web is driven between pinch rolls and brought into contact with said transfer surface only during the time of label transfer, driving said transfer wheel while said servo motor is passive and wherein said first product unit is driven by a conveyor and drives said transfer wheel during the time of label transfer thereto while said servo motor is passive, said servo motor driving said transfer roll through the other portions of the cycle thereof.

* * * * *